United States Patent
Sikes

(10) Patent No.: US 6,813,995 B1
(45) Date of Patent: Nov. 9, 2004

(54) CONVECTION BASED COOKING APPARATUS WITH IMPROVED DRAFT CHIMNEY

(76) Inventor: Jimmy A. Sikes, P.O. Box 443, Vidalia, GA (US) 30475

( * ) Notice: Subject to any disclaimer, the term of this patent is extended or adjusted under 35 U.S.C. 154(b) by 95 days.

(21) Appl. No.: 09/677,164

(22) Filed: Oct. 2, 2000

Related U.S. Application Data

(60) Continuation-in-part of application No. 09/329,690, filed on Jun. 10, 1999, now Pat. No. 6,143,341, which is a division of application No. 09/083,416, filed on May 22, 1998, now Pat. No. 6,038,964.
(60) Provisional application No. 60/061,042, filed on Sep. 26, 1997.

(51) Int. Cl.[7] ............................................... A47J 37/07
(52) U.S. Cl. ........................... 99/449; 99/473; 99/481; 126/9 R; 126/21 R; 126/28; 126/268; 126/276; 126/307 R
(58) Field of Search ...................... 99/447, 449, 473, 99/474, 481; 126/15 R, 15 A, 21 R, 21 A, 268, 1 AE, 273 R, 28, 9 R, 276, 211, 220, 307 R, 307 A, 312

(56) References Cited

U.S. PATENT DOCUMENTS

| | | | |
|---|---|---|---|
| 103,715 A | * 5/1870 | Buys | |
| 753,143 A | 2/1904 | Kimmons | ................ 99/482 X |
| 1,045,643 A | 11/1912 | Tucker | ................ 99/482 X |
| 2,350,948 A | * 6/1944 | Walker | ................ 126/25 |
| 2,851,941 A | * 9/1958 | Cogar | ................ 99/259 |
| 3,477,360 A | * 11/1969 | Raney | ................ 99/339 |
| 3,561,348 A | 2/1971 | Weir, Sr. | ................ 99/446 X |
| 3,568,590 A | 3/1971 | Grice | ................ 99/446 |
| 3,699,876 A | * 10/1972 | Ellis | ................ 99/396 |
| 3,769,901 A | * 11/1973 | Phillips | ................ 99/444 |
| 4,062,983 A | 12/1977 | Roderick | ................ 426/418 |
| 4,064,796 A | 12/1977 | Jones | ................ 99/330 |
| 4,095,586 A | * 6/1978 | Selva | ................ 126/273 R |
| 4,189,995 A | 2/1980 | Lohr et al. | ................ 99/447 |
| 4,202,259 A | 5/1980 | Johansson | ................ 99/352 |
| 4,244,979 A | 1/1981 | Roderick | ................ 426/418 |
| 4,348,948 A | 9/1982 | Allison | ................ 99/339 |
| 4,469,020 A | 9/1984 | Hamilton et al. | ................ 99/352 |
| 4,510,854 A | 4/1985 | Robertson | ................ 99/337 |
| 4,700,618 A | * 10/1987 | Cox, Jr. | ................ 99/339 |
| 4,773,319 A | * 9/1988 | Holland | ................ 99/446 |
| 4,840,118 A | * 6/1989 | Rinehart | ................ 99/446 |
| 4,928,663 A | 5/1990 | Nevin et al. | ................ 126/21 |
| 4,934,260 A | 6/1990 | Blevins | ................ 99/476 X |
| 4,971,023 A | * 11/1990 | Martinez | ................ 126/21 R |
| 4,979,436 A | * 12/1990 | McGowan | ................ 99/340 |
| 5,285,770 A | * 2/1994 | Kim | ................ 126/25 B |
| 5,331,886 A | 7/1994 | Basel | ................ 99/446 |
| 5,481,964 A | * 1/1996 | Kitten | ................ 99/339 |
| 5,533,444 A | 7/1996 | Parks | ................ 99/476 |

* cited by examiner

*Primary Examiner*—Drew Becker
(74) *Attorney, Agent, or Firm*—Lava Group Law by Smith & Frohwein, LLC; Gregory Scott Smith

(57) ABSTRACT

A draft chimney for a convection based apparatus. The draft chimney comprises a flue at least partially defining a path of convection airflow through at least a portion of the interior of a cabinet. The flue passes convection airflow to the exterior of the cabinet.

19 Claims, 4 Drawing Sheets

US 6,813,995 B1

CONVECTION BASED COOKING APPARATUS WITH IMPROVED DRAFT CHIMNEY

This application is a continuation-in-part of U.S. application Ser. No. 09/329,690 filed Jun. 10, 1999 entitled "A Convention Based Cooking Apparatus with Improved Air Flow," now U.S. Pat. No. 6,143,341, which is a divisional of U.S. application Ser. No. 09/083,416 filed May 22, 1998, now U.S. Pat. No. 6,038,964, which claims priority from U.S. Provisional Application No. 60/061,042 filed Sep. 26. 1997.

TECHNICAL FIELD

The present invention relates to convection based ovens, grills and similar cooking apparatus and, more specifically, to a convection based cooking apparatus with an internal draft chimney.

BACKGROUND OF THE INVENTION

Convection based cooking apparatus operate on the principle that hot air rises. A heating element generates hot air within a cabinet of the cooking device. The hot air generated by the heating element is drawn over a cooking surface inside the cabinet. Typically, an elongated draft chimney is used as a draft generator to pull air through the cabinet interior. Known draft chimneys are attached to the exterior of a side wall of the cabinet. The heated air that is forced into the chimney rises to the top of the chimney and exits through an opening at the top of the chimney. As the heated air rises through the chimney, a vacuum, similar to a siphon, is generated to draw additional air through the interior of the cabinet. This allows items on the cooking surface to be cooked more quickly. Alternatively, decreasing the rate of airflow through the chimney allows items on the cooking surface to be cooked at a slower rate.

However, these known draft chimneys attached to the exterior of the cabinet are large and cumbersome. The length of the chimney typically extends approximately two feet above the cabinet. Also, because the chimneys are attached to the exterior side wall of the cabinet, the width of the entire apparatus is increased by at least the width of the chimney.

Therefore, there is a need in the art for a compact convection based apparatus that does not include a massive, exterior mounted, chimney, but continues to facilitate airflow as described above.

SUMMARY OF THE INVENTION

The present invention solves the above-identified problem by providing an improved draft chimney for convention based cooking apparatus. The improved draft chimney of the present invention is substantially contained within the confines of the cabinet of the cooking apparatus.

Generally described, the draft chimney of the present invention includes a flue. The flue at least partially defines a path of convection airflow through at least a portion of the interior of a cabinet of the cooking apparatus. The flue passes convection airflow to the exterior of the cabinet.

In one aspect of the present invention, the draft chimney is entirely defined within the cabinet and the path of convection airflow communicates with the exterior of the cabinet at an end of the path.

More particularly described, the flue includes opposing first and second openings. The first opening communicates with the cabinet interior and is at least partially defined by at least a portion of a surface of the cabinet interior. Preferably, the first opening is at least partially defined by either a portion of a bottom surface of the cabinet or by the entire width of the bottom surface of the cabinet.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments.

Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION

Figure 1:
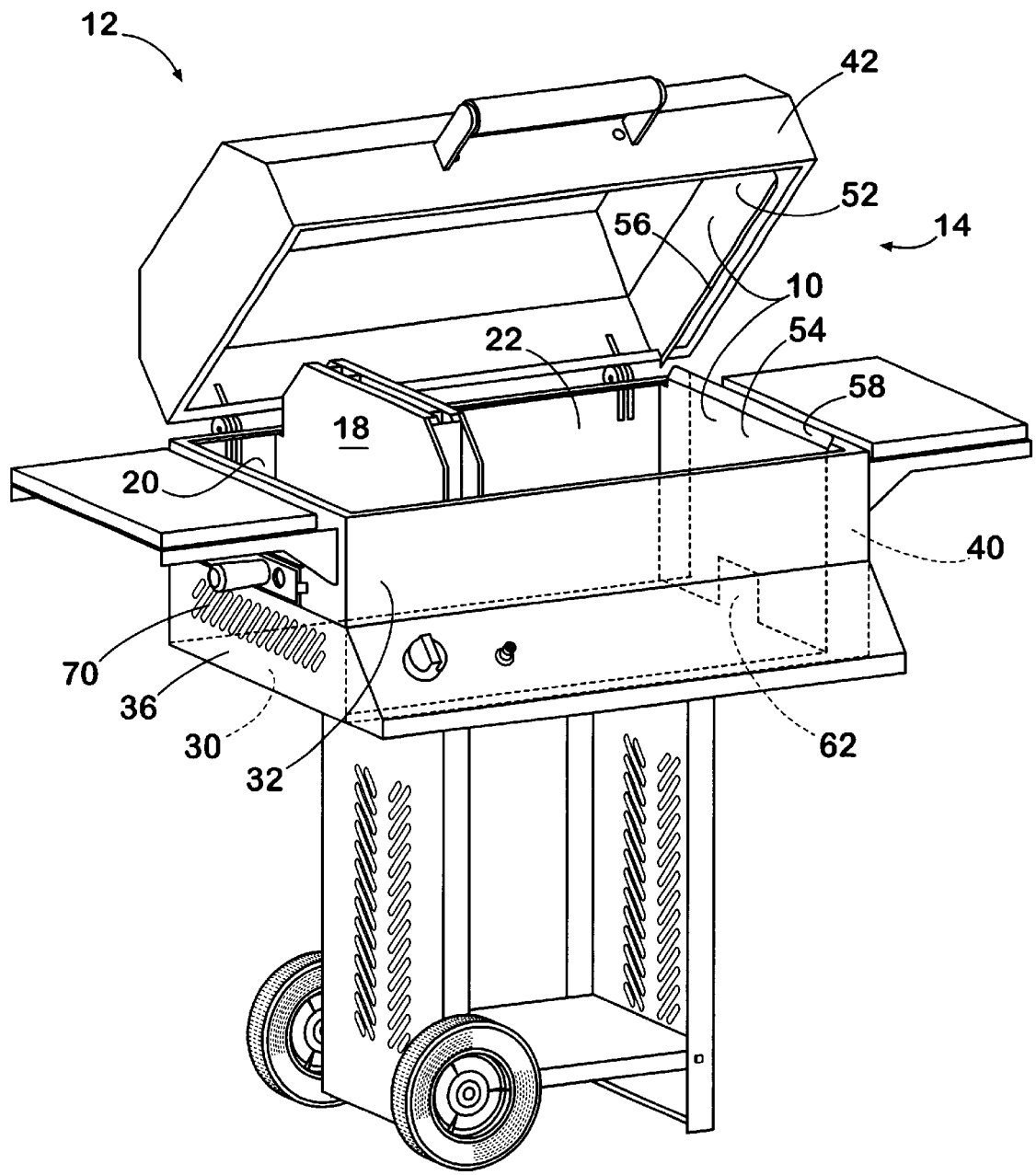
FIG. 1 illustrates a perspective view of one embodiment of the improved draft chimney of the present invention within a convection based grill.
Figure 2:
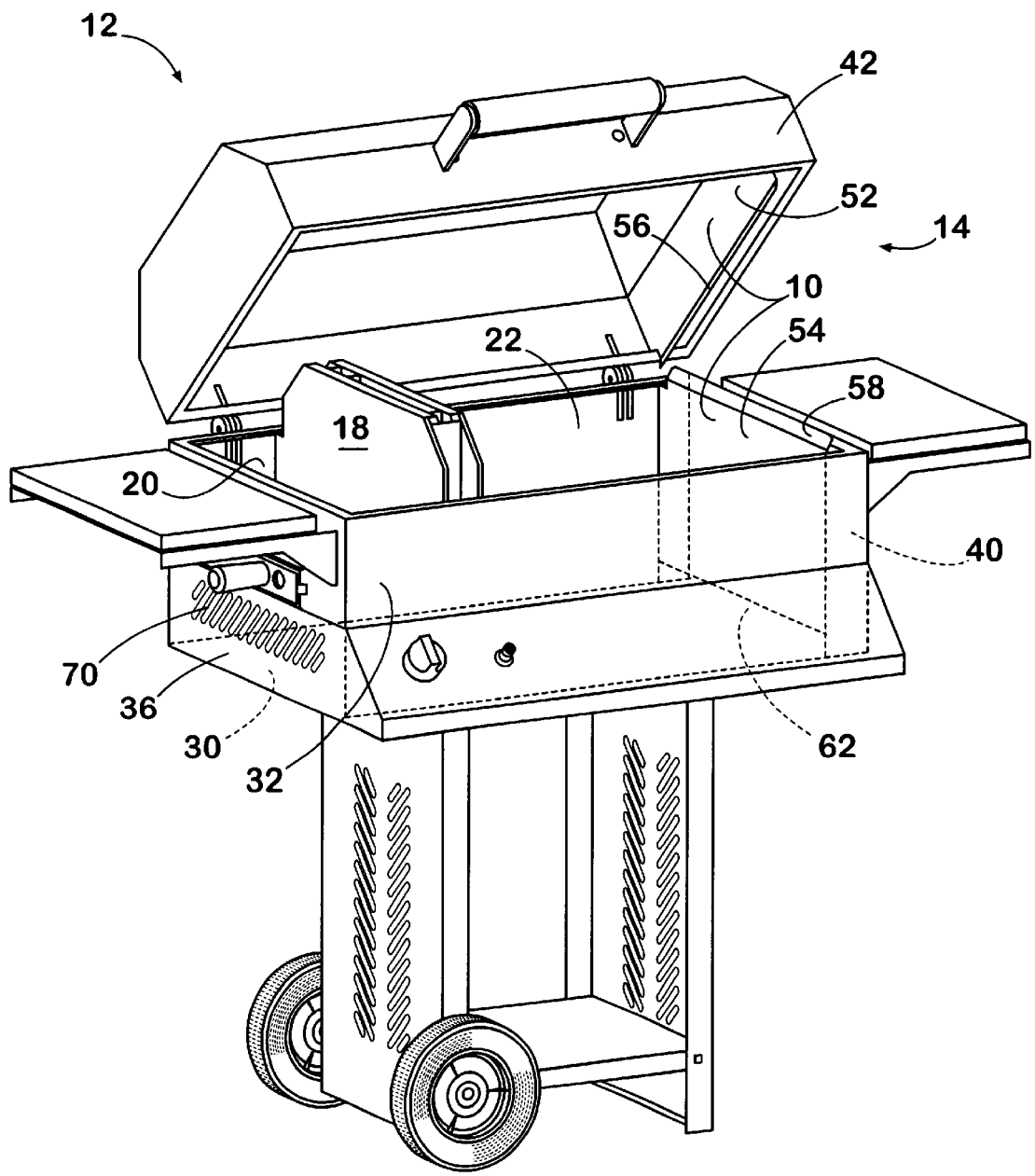
FIG. 2 illustrates a perspective view of an alternative embodiment of the improved draft chimney of the present invention within a convection based grill.
Figure 3A:
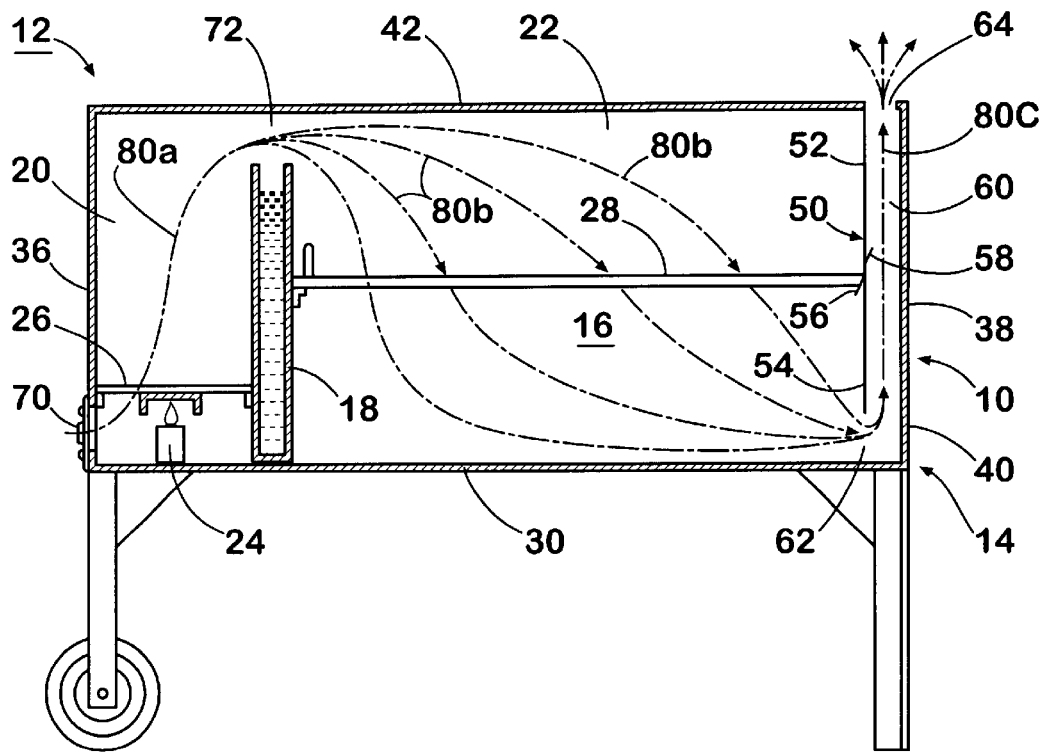
FIGS. 3A and 3B illustrate a side view of the convection based grill of either of FIGS. 1 and 2.
Figure 3B:
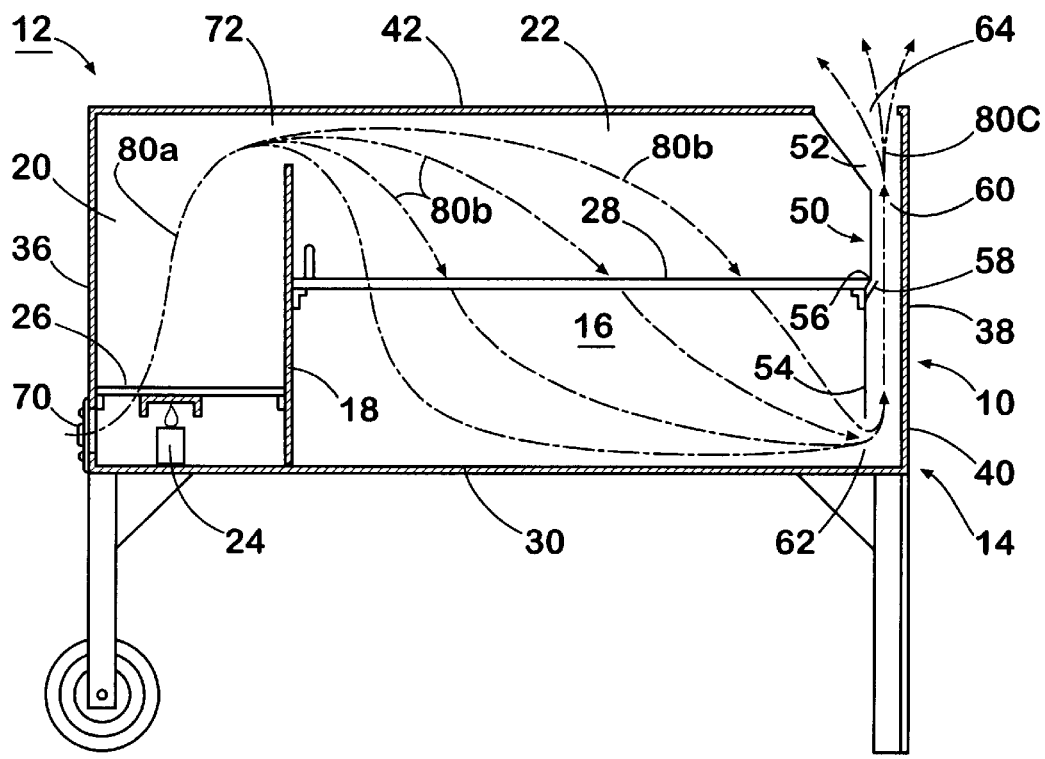

Referring now to the drawings in which like numerals indicate like elements throughout the several views, FIGS. 1 and 2 each depict one embodiment of an improved draft chimney 10 of the present invention within a convection based grill 12. Each convection based grill 12 includes a cabinet 14 with a plurality of surfaces for defining a cabinet interior 16 (FIGS. 3A and 3B). The cabinet interior 16 is divided into two chambers by an insulating baffle 18 extending across the longitudinal dimension of the cabinet 14. The two chambers include a heating chamber 20 and a cooking chamber 22.

In the lower portion of the heating chamber 20 is a heating element 24 and a steel flame grate 26 is positioned over the heating element 24. A cooking surface 28 substantially extends the length and the width of the cooking chamber 22. The grill 12 is described in greater detail in U.S. Pat. No. 6,038,964 filed on May 22, 1998 and titled "A CONVECTION BASED COOKING APPARATUS WITH IMPROVED AIR FLOW", and in U.S. Pat. No. 6,143,341 filed on Jun. 10, 1999 and titled "A CONVECTION BASED COOKING APPARATUS WITH IMPROVED AIR FLOW", the entire disclosures of which are incorporated herein by reference.

Figure 4:
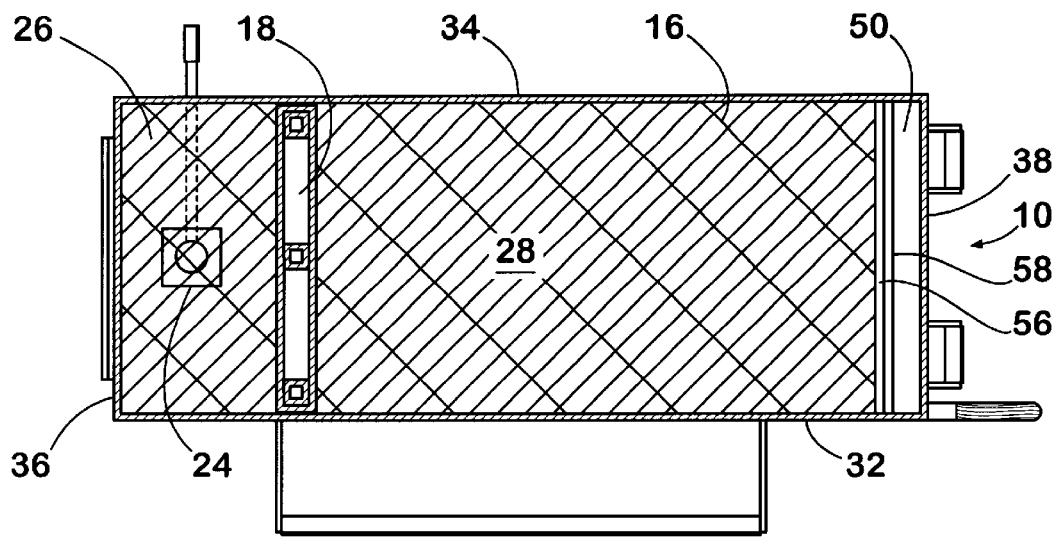
FIG. 4 illustrates a top view of the convection based grill of either of FIGS. 1 and 2.

Referring now to FIGS. 3A, 3B and 4, the cabinet 14 is defined by a bottom surface 30, a front surface 32, a back surface 34, a left side surface 36, and a right side surface 38. The combination of the bottom surface 30 with lower portions of the front surface 32, the back surface 34, the left side surface 36 and the right side surface 38, defines a lower portion of the cabinet interior, and is commonly referred to as a lower container 40. Also, the cabinet 14 is further defined by a hood 42, the interior of which is commonly referred to as an upper cabinet interior, best illustrated in FIG. 5. The hood 42 is defined by upper portions of the front surface 32, the back surface 34, the left side surface 36, and the right side surface 38.

Still referring to FIGS. 3A and 3B, the chimney 10 is defined by the right side surface 38, portions of the front and back side surfaces 32, 34, and an internal surface 50 positioned in substantially a vertical manner. In FIG. 3A, the internal surface 50 is parallel to the right side surface 38. In another embodiment, as shown in FIG. 3B, a portion of the internal surface 50 is parallel to the right side surface 38 and an another portion of the internal surface 50 tapers away from the right side surface 38.

As best shown in FIGS. 1 and 2, the internal surface 50 has an upper portion 52 and a lower portion 54. The upper portion 52 is attached to the inside of the hood 42 and the lower portion 54 is attached to the inside of the lower container 40. When the hood 42 is opened to expose the cabinet interior 16 as shown in FIGS. 1 and 2, the draft chimney 10 is separated into two pieces. However, when the hood 42 is closed as shown in FIGS. 3A and 3B, the upper and lower portions 52, 54 are joined together to define the entire length of the draft chimney 10. The length of the draft chimney is commonly refer to as a flue and is described in greater detail below.

In order to insure the upper and lower portions 52, 54 of the internal surface 50 are properly joined together each time they come into contact with each other, the ends of each portion are bent back in a widthwise manner to define flanges 56 and 58. The end of the upper portion 52 of the internal surface is bent inward and the end of the lower portion 54 of the internal surface in bent outward toward the right side surface 38 to form a seal when the hood 42 is closed. FIG. 4 also illustrates the inwardly bent flanges 56, 58 of the internal surface 50. The seal is formed by permitting the upper and lower portions 52, 54 to overlap as shown in FIG. 3A. Alternatively, as shown in FIG. 3B, the seal could be formed by permitting the flange 56 to directly abut the flange 58 without the upper and lower portions 52, 54 overlapping.

The draft chimney 10 includes an elongated, vertical flue 60 having a first opening 62 and a second opening 64. The internal surface 50 defines a portion of the flue 60. Therefore, the flue 60 is separable into two portions as shown in FIGS. 1 and 2. Preferably, the flue 60 is prismatic and the length of the flue 60 in the direction of airflow is longer than the width of the flue; however, alternative configurations are also anticipated by the present invention. The first opening 62 communicates with the cabinet interior 16. Preferably, the first opening 62 is defined between the bottom surface 30 and the end of the vertically positioned internal surface 50 as shown in FIGS. 1 and 2. The width of the first opening 62 can extend only a portion of the width of the cabinet 14 as shown in FIG. 1 or, alternatively, the width of the first opening 62 can extend the full width of the cabinet 14 as shown in FIG. 2.

Figure 5:
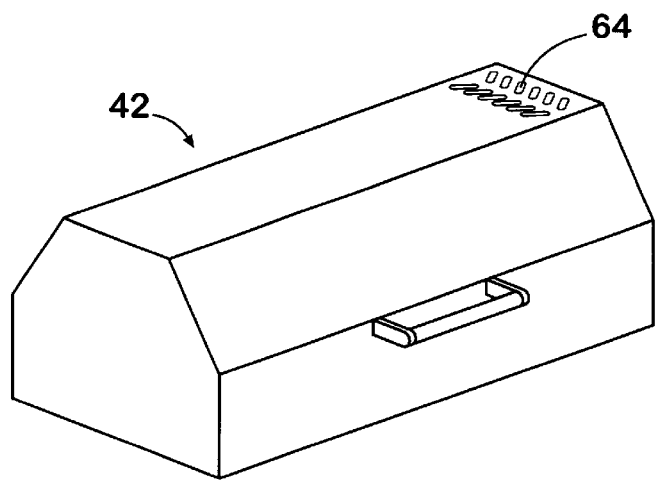
FIG. 5 illustrates a perspective view of one embodiment of a hood of a convection based grill showing, in particular, a plurality of exit openings for venting airflow from the cabinet through the chimney of the present invention.

In operation, ambient air enters the heating chamber 20 through an air inlet 70. The ambient air is heated and rises through the steel frame grate 26 towards the top of the heating chamber 20. Eventually, the heated air is forced through an air passage 72 over the baffle 18 into the cooking chamber 22. As the heated air is forced into the cooking chamber 22, the cooler air existing the cooking chamber 22 is forced down through the first opening 62 of the flue 60. The heated air that is forced into the flue 60 of the draft chimney 10 rises to the top and exits through the second opening 64 in the top of the hood 42 to the environment surrounding the cabinet 14. In the preferred embodiment, a plurality of smaller exit openings combined together to form the second opening 64 as shown in FIG. 5. The portion of the surface with the smaller exit openings is commonly referred to as being grilled.

A path of convection airflow, generally shown by arrows 80a, 80b and 80c in FIGS. 3A and 3B is created within the cabinet 14 during operation of the grill 12. The portion 80a of the path begins at the air inlet 70 and proceeds to the passage 72 over the baffle 18 as described above. Then, the path continues through the cooking chamber 22 to pass over the cooking surface 28 in an even manner. This portion of the path is shown by the reference numeral 80b. Next, the path continues to the first opening 62 of the flue 60 of the draft chimney 10. The portion 80c begins at the first opening 62, rises to the second opening 64, and passes into the exterior environment surrounding the grill 12. Preferably, the draft chimney 10 is entirely defined within the cabinet 14 such that the end of the path 70 communicates with the exterior of the cabinet as best shown in FIGS. 1–3A and 3B. Alternatively, the flue 60 may extend beyond the top of the hood 42 so that a portion of the path of airflow extends beyond the cabinet 16 before exiting to the environment surrounding the grill.

The present invention has been illustrated in relation to particular embodiments which are intended in all respects to be illustrative rather than restrictive. Those skilled in the art will recognize that the present invention is capable of many modifications and variations without departing from the scope of the invention. Accordingly, the scope of the present invention is described by the claims appended hereto and supported by the foregoing.

What is claimed is:

1. A draft chimney for a convection based apparatus, said convection based apparatus having a cabinet defining a cabinet interior and including a hood and a lower container, said draft chimney at least partially defining a path of convection airflow through at least a portion of the cabinet interior, said draft chimney passing convection airflow from said cabinet; and said cabinet being operable to open, thereby exposeing said cabinet interior and separating said draft chimney into at least two portions at least one portion of said draft chimney remaining within said lower container of said cabinet interior.

2. The draft chimney of claim 1 wherein said path communicates with the exterior of the cabinet at an end of said path.

3. The draft chimney of claim 1 wherein said draft chimney is entirely defined within the cabinet.

4. The draft chimney of claim 1 wherein the length of said draft chimney in the direction of airflow is longer than the width of said draft chimney.

5. The draft chimney of claim 1 wherein said draft chimney is prismatic and at least partially defined by an interior surface of the cabinet.

6. The draft chimney of claim 1 wherein said draft chimney includes opposing first and second openings, said first opening communicating with the cabinet interior and at least being partially defined by at least a portion of an interior surface of the cabinet.

7. The draft chimney of claim 1, wherein said first opening is at least partially defined by at least a portion of an interior bottom surface of the cabinet.

8. The draft chimney of claim 1 wherein said first opening is at least partially defined by the entire width of an interior bottom surface of the cabinet.

9. A convection cooking apparatus comprising:

a cabinet having surfaces that define a cabinet interior and including a hood and a lower container; and a draft chimney for creating airflow through the interior of the cabinet, said drafting chimney at least partially defining an airflow path through at least a portion of the cabinet interior, wherein said cabinet being operable to open, thereby exposing said cabinet interior and separating said drafting chimney into at least two portions.

10. The apparatus of claim 9 wherein said path communicates with the exterior of said cabinet at an end of said path.

11. The apparatus of claim 9 wherein said drafting chimney is entirely defined within said cabinet.

12. The apparatus of claim 9 wherein said draft chimney comprises an elongated conduit defining a first opening and a second opening on opposing ends of said elongated conduit, said first opening communicating with said interior of said cabinet.

13. The apparatus of claim 12 wherein said elongated conduit is substantially vertically oriented.

14. The apparatus of claim 12 wherein the length of said draft chimney in the direction of airflow is longer than the width of said draft chimney.

15. The apparatus of claim 12 wherein said first opening communicates with the cabinet interior and is at least partially defined by at least a portion of one of the interior surfaces of said cabinet.

16. The apparatus of claim 12 wherein said first opening is at least partially defined by at least a portion of an interior bottom surface of the cabinet.

17. The draft chimney of claim 12 wherein said fist opening is at least partially defined by the entire width of an interior bottom surface of the cabinet.

18. The apparatus of claim 12 wherein said draft chimney is prismatic and at least partially defined by one of the interior surfaces of the cabinet.

19. The apparatus of claim 12 wherein a first portion of said draft chimney is substantially contained within an upper portion of the cabinet interior and a second portion of said draft chimney is substantially contained within a lower portion of the cabinet interior.

* * * * *